United States Patent

Ratnikas

[15] 3,695,652

[45] Oct. 3, 1972

[54] ACTUATOR ROD CONNECTOR

[72] Inventor: Jonas Ratnikas, Dearborn, Mich.

[73] Assignee: Ford Motor Company, Dearborn, Mich.

[22] Filed: Oct. 21, 1971

[21] Appl. No.: 191,268

[52] U.S. Cl. .................................287/93, 287/20.5
[51] Int. Cl. .................................................F16c 11/00
[58] Field of Search ........................287/93, 20.5 R

[56] References Cited

UNITED STATES PATENTS

| | | | |
|---|---|---|---|
| 3,231,300 | 1/1966 | Moroney | 287/93 |
| 3,253,480 | 5/1966 | Fernberg | 287/93 X |
| 3,401,960 | 9/1968 | Saunders | 287/20.5 R |

*Primary Examiner*—Andrew V. Kundrat
*Attorney*—Keith L. Zerschling and John J. Roethel

[57] ABSTRACT

A pivoted lever member having an aperture at one end, an elongated substantially L-shaped actuating rod for swinging the lever member, and an integrally molded plastic connecting device for coupling the actuating rod to the apertured end of the lever member.

The connecting device comprises a base member having an actuating rod receiving aperture at one end and cylindrical retention means insertable through the lever member aperture for holding the connecting means on the latter. The cylindrical retention means projects from the apertured end of the base member and has a bore axially aligned with the aperture adapted to receive a short leg of the L-shaped actuating rod. The base member has spaced upstanding side walls adapted to receive a long leg of the L-shaped actuating rod therebetween. The side walls of the base member terminate in opposed retention flanges having a space therebetween less than the thickness of the actuating rod whereby the long leg of the L-shaped rod must be forced between the retention flanges as its short leg is inserted into the cylindrical means bore for a permanent connection to be made. Coating retention means on the long leg of the actuating rod are engageable by the retention flanges to inhibit separation of the actuating rod from the connecting device.

4 Claims, 4 Drawing Figures

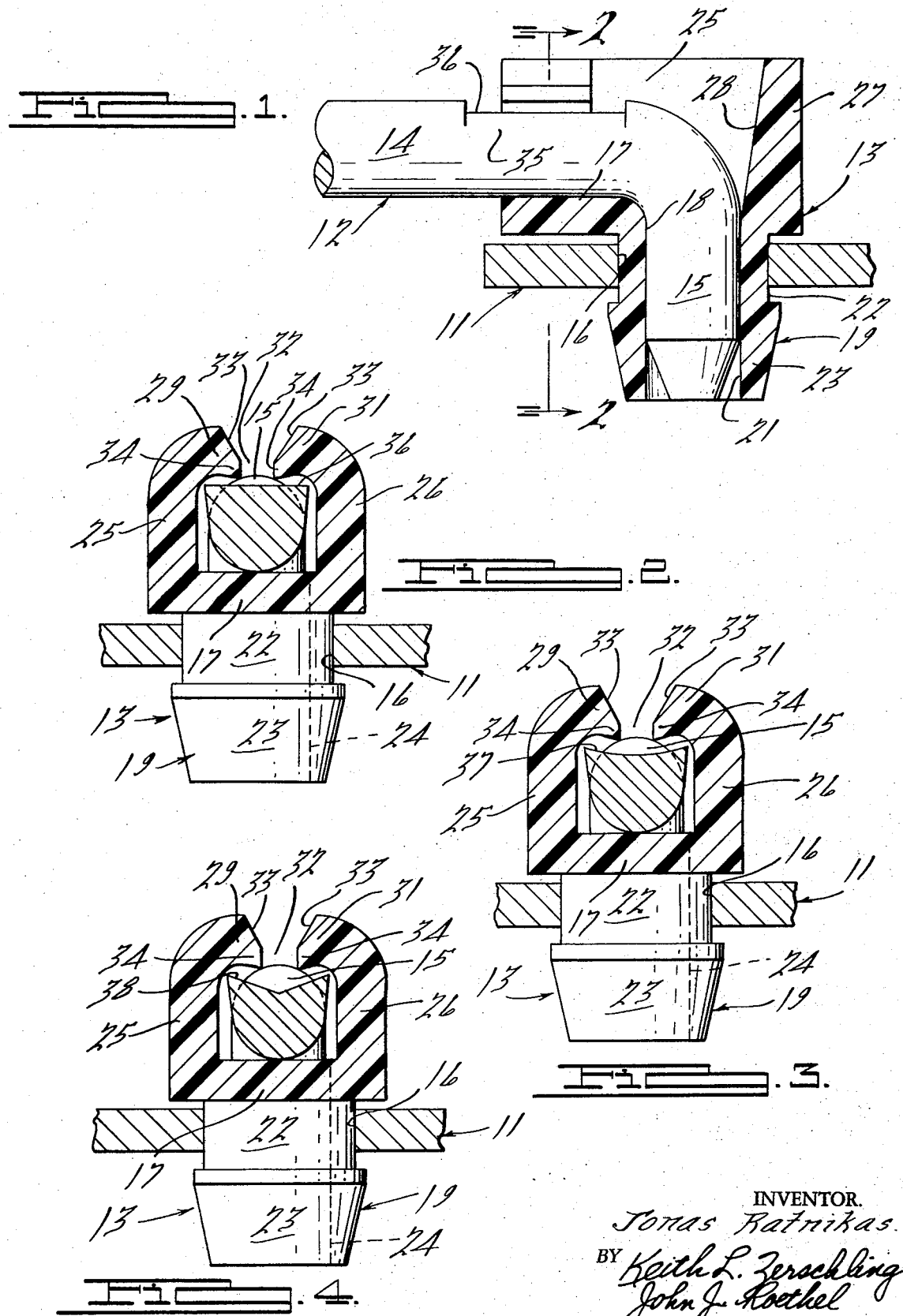

ACTUATOR ROD CONNECTOR

BACKGROUND OF THE INVENTION

The present invention represents an improvement over a "Connecting Means" disclosed in U.S. Pat. No. 3,231,300 issued Jan. 25, 1966 to W. N. Moroney. The Moroney patent discloses a plastic connecting means in which the right angled end of the actuating rod is pushed through an aperture in the device and retained in a cylindrically-shaped recess in a head portion of the latter. A retention recess receives the actuating rod at the juncture of the main rod portion with its right angled end portions. Since this juncture is a curved corner, only a small portion of the recess walls are engaged by the actuating rod and much of the retention strength is wasted.

U.S. Pat. application Ser. No. 145,680 filed May 21, 1971, by Donald R. Hoffmann for "Rod End Connector" was an attempt to achieve the quick single motion assembly of the Moroney connecting device while at the same time achieving greater resistance to separation of the actuating rod from the lever member. It has been found, however, that even with the modification of the structure disclosed by Hoffmann, the actuating rods on occasion have a tendency to slip out of the connecting device.

Accordingly, it is an object of the present invention to provide more positive retention of the actuating rod to the lever member than is afforded by Hoffmann while retaining the single motion assembly of the Moroney connecting device.

SUMMARY OF THE INVENTION

The present invention relates to the combination of a pivoted lever member having an aperture at one end, an elongated substantially L-shaped actuating rod for swinging the lever member in a predetermined plane, and a connecting device for coupling the actuating rod to the apertured end of the lever member.

The long leg of the L-shaped actuating rod is substantially parallel to the plane of swinging movement of the lever member and the short leg of the L-shaped actuating rod is adapted to project through the aperture in the lever member. The connecting device for holding the actuating rod in operative relationship to the lever member is an integrally molded plastic unit having a short flat base member with an aperture at one end. A substantially cylindrical retention means projects from the apertured end of the base member and has a bore therethrough axially aligned with the base member aperture. The cylindrical retention means comprises a reduced shank portion having a diameter complementary to the lever member aperture and a compressible tapered shoulder portion slightly larger in cross sectional area than the shank portion. The tapered shoulder portion is compressible to a size at which it will pass through the lever member aperture. Upon the shoulder portion being projected through the lever member aperture, it is adapted to expand to prevent subsequent disconnection of the connection device from the lever member.

The base member has based upstanding side walls adapted to receive the long leg of the L-shaped actuating rod therebetween. The side walls terminate in opposed or inwardly turned retention flanges having a space therebetween less than the thickness of the actuating rod whereby the long leg of the L-shaped rod must be forced between the retention flanges as its short leg is inserted into the cylindrical means bore. The long leg of the actuating rod has coacting retention means which is engageable with the retention flanges to further inhibit separation of the actuating rod from the connecting device.

The retention means on the actuating rod comprises a non-circular formed section which may be a flat surface, an elongated V-shaped depression or an elongated depression having a concave cross section.

DESCRIPTION OF THE DRAWING

Further features and advantages of the present invention will be explained in greater detail making reference to the description which now follows, reference being had to the drawing, in which:

FIG. 1 is a side elevational view, in part sectional, of the end of an actuating rod in operative relationship to a lever member and held in such relationship by a connector device embodying the present invention;

FIG 2 is a vertical section view on the line 2—2 of FIG. 1;

FIG. 3 is a section view in part similar to FIG. 2 illustrating a second embodiment of the present invention; and FIG. 4 is a section view substantially similar to FIG. 2 illustrating another embodiment of the present invention.

DETAILED DESCRIPTION OF THE INVENTION

Referring now to the drawing, FIG. 1 illustrates, in combination, a fragmentary portion of a pivoted lever member 11, an elongated substantially L-shaped actuating rod 12 for swinging the lever member in a predetermined plane, and a connecting device 13 for coupling the actuating rod 12 to the lever member 11.

Reference may be made to FIG. 1 of E. G. Trudeau, U.S. Pat. No. 3,312,489, issued Apr. 4, 1967, entitled "Door Latch Mechanism" for a typical actuating rod-lever member connection of the type to which the present invention is applicable.

The actuating rod 12 terminates at its end adapted to be coupled to the lever member 11 at a substantially L-shaped end section. The long leg 14 of the end section substantially parallels the plane of swinging movement of the lever member 11. The short leg 15 is at substantially a right angle to the long leg 14 for axial alignment with an aperture 16 in the lever member 11.

The connecting device 13 is an integrally molded plastic unit having a short flat base member 17 with an aperture 18 at one end. A substantially cylindrical retention means 19 projects from the aperture 18 and the base member 17, the cylindrical retention means 19 having a bore 21 therethrough axially aligned with the base member aperture 18 and therefore the lever member aperture 16. The cylindrical retention means comprises a reduced shank portion 22 having a diameter complementary to the lever member aperture 16 and a compressible tapered shoulder portion 23 slightly larger in cross sectional area than the shank portion. The tapered shoulder portion 23 is compressible to a size at which it will pass through the lever member aperture 16. To facilitate the compressibility of the cylindrical extension tapered shoulder portion 23, it may be provided with a slot 24 extending toward the base member as shown in the aforementioned Hoffmann application Ser. No. 145,680. The base member 17 has spaced upstanding side walls 25 and 26 adapted to receive the long leg 14 of the L-shaped actuating rod 12 therebetween. The side walls 25 and 26 terminate in a tapered end wall 27, the tapered inner surface 28 of which forms a guide for leading the short leg 15 of the actuating rod 12 into the aperture 18 in bore 21 of the connecting device 13.

The side walls 25 and 26 have at their upper edges opposed or inwardly turned retention flanges 29 and 31 having a space 32 therebetween. The space 32 is less than the thickness of the actuating rod 12. The long leg 14 of the L-shaped actuating rod 12 thus must be forced between the retention flanges 29–31 through the space 32 if the short leg 15 is to be inserted into the connecting device bore 21. To facilitate such insertion, the lead edges of the flanges 29 and 31 are chamfered as at 33. The undersides of the flanges 29 and 31 are downwardly inclined at an angle of 5° to 15° to provide prong-like engagement with the upper surface of the long leg 14 of the rod 12 to resist separation movement of the rod 12 from the connecting device 13.

To further inhibit withdrawal of the actuating rod 12 from the connecting device 13, the upper surface of the long leg 14 of the rod 12 is provided with a non-circular section 35 to underlie the elongated prongs 34. The non-circular section 35 upper surface may comprise any one of several shapes. As shown in FIG. 2, the surface may be flat. As shown in FIG. 3, the upper surface may be formed as a shallow, elongated depression 37 having a concave cross section and as seen in FIG. 4, it may be a shallow, elongated V-shaped depression 38.

It thus will be readily apparent that the actuating rod may be assembled easily and with a single motion to the connecting device 13 which is preassembled to the lever member 11. Because of the overhanging retention flanges 29–31 and the withdrawal resisting prongs 34, inadvertent disengagement of the actuating rod 12 from the connecting device 13 and lever member 11 subassembly becomes most unlikely. Further, sufficient force must be exerted on the rod 12 to pass it through the space 32 between the flanges 29–31 to insure complete assembly. If insufficient force is applied, the rod will be rejected by the chamfered surfaces 33 of the flanges 29–31 and the assembler will have a loose rod in his hand.

It will be understood that the invention is not to be limited to the exact construction shown and described, but that various changes and modifications may be made without departing from the spirit and scope of the invention as defined in the appended claims.

What I claim is:

1. In combination, a pivoted lever member having an aperture at one end, an elongated substantially L-shaped actuating rod for swinging the lever member in a predetermined plane, and a connecting device for coupling the actuating rod to the apertured end of the lever member, the long leg of the L-shaped actuating rod substantially paralleling the plane of swinging movement of the lever member and the short leg of the L-shaped actuating rod projecting through the aperture in the lever member, the connecting device being an integrally molded plastic unit having a short flat base member with an aperture at one end, a substantially cylindrical retention means projecting from the apertured end of the base member and having a bore therethrough axially aligned with the base member aperture, the cylindrical retention means comprising a reduced shank portion having a diameter complementary to the lever member aperture and a compressible tapered shoulder portion slightly larger in cross sectional area than the shank portion, the tapered shoulder portion being compressible to a size at which it will pass through the lever member aperture, the shoulder portion upon projecting through the lever member aperture expanding to prevent disconnection of the connection device and lever member, the base member having spaced upstanding side walls adapted to receive the long leg of the L-shaped actuating rod therebetween, the side walls having opposed retention flanges having a space therebetween less than the thickness of the actuating rod whereby the long leg of the L-shaped rod must be forced between the retention flanges as its short leg is inserted into the cylindrical means bore, and a non-circular formed section on the long leg of the actuating rod engageable with the retention flanges inhibiting separation of the actuating rod from the connecting device.

2. In the combination, as set forth in claim 1, in which:

the non-circular formed section comprises a flat surface across the top of the long leg of the actuating rod.

3. In the combination, as set forth in claim 1, in which:

the non-circular formed section comprises a shallow elongated V-shaped depression.

4. In the combination, as set forth in claim 1, in which:

the non-circular formed section comprises an elongated depression having a concave cross section.

* * * * *